United States Patent
Suzuki (10) Patent No.: US 6,327,446 B1
(45) Date of Patent: Dec. 4, 2001

(54) MULTI-MODE IMAGE FORMING APPARATUS HAVING SERVICE MODE FOR AUTHORIZED USERS AND METHOD THEREFOR

(75) Inventor: Kazuhisa Suzuki, Sagamihara (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/525,470

(22) Filed: Mar. 15, 2000

(51) Int. Cl.$^7$ .................................................. G03G 15/00
(52) U.S. Cl. .............................. 399/75; 399/11
(58) Field of Search .................. 399/75, 77, 83, 399/11

(56) References Cited

U.S. PATENT DOCUMENTS 5,893,005 * 4/1999 Ogura ....................................... 399/11
5,995,771 * 11/1999 Miyawaki .......................... 399/11 X

FOREIGN PATENT DOCUMENTS 8-125794    5/1996   (JP) .

* cited by examiner

Primary Examiner—Fred L. Braun
(74) Attorney, Agent, or Firm—Foley & Lardner (57) ABSTRACT

A multi-mode image forming apparatus and method have a first mode which can be used by all users and a second mode which is available to authorized users only. The second mode is induced in response to a request from a management apparatus which is connected image forming apparatus. A reception arrangement is arranged to receive updating data sent from the management apparatus in the second mode and to store this data in a memory from which a non-volatile memory of the image forming apparatus can be updated at a later time. This arrangement permits file data to be transferred from the management apparatus to a HDD in the image forming apparatus. During an update, this data can be read out from the HDD to an EEPROM (non-volatile memory) so that even if the updating operation fails, the time for repeating the updating can be minimized.

19 Claims, 5 Drawing Sheets

MULTI-MODE IMAGE FORMING APPARATUS HAVING SERVICE MODE FOR AUTHORIZED USERS AND METHOD THEREFOR

BACKGROUND OF THE INVENTION

The present invention relates to an image forming apparatus, such as a complex-type digital copying machine provided with various functions including a copy function and a network printer function.

In a conventional image forming apparatus, such as a digital copying machine, a control program and display data are updated by physically replacing a ROM, in which the data are stored, with another.

When the ROM is physically replaced with another, a plate has to be removed, connectors and other members, with which a circuit board is connected, have to be detached. Due to this, an installation error may occur during the ROM replacement. In addition, some of the connections or other members may be left disconnected, or they may not be connected in a reliable manner. Another problem is that the ROM replacement requires that the serviceman go over to the place where the image forming apparatus is installed. Since the power switch of the digital copying machine is kept off during the ROM replacement, ordinary uses cannot execute the copy or print operation in the meantime.

BRIEF SUMMARY OF THE INVENTION

To solve the above problems, the present invention is intended to provide an image forming apparatus which permits a control program, graphic data for display, and language data on each country to be updated with no need for physical replacement of the ROM, and which can be set in a special mode when the data is updated, thereby enabling the updating of the data in a safe state.

The present invention is also intended to provide an image forming apparatus which can store updating data, and which can therefore save the trouble of performing the retransmission of the updating data in the case where the data updating processing results in failure or where the present data is replaced with other data, such as the data updated previously.

There is provided an image forming apparatus which has a first mode that can be used by all users and a second mode that can be used by authorized users only, and which executes image forming processing in the first mode, the apparatus comprising: a nonvolatile memory for storing various kinds of data; mode switching means for setting the apparatus in the second mode in response to a request from a management apparatus, which is connected to the image forming apparatus through a communication line; reception means for receiving updating data when the second mode is selected by the mode switching means, the updating data being sent from the management apparatus and to be stored in the nonvolatile memory; storage means for storing the updating data received by the receiving means; and updating means for updating contents of the nonvolatile memory on the basis of the updating data stored in the storage means.

The present invention also provides a combination of: an image forming apparatus which has a first mode that can be used by all users and a second mode that can be used by authorized users only, and which executes image forming processing in the first mode; and a management apparatus connected to the image forming apparatus through a communication line, the apparatus comprising: a nonvolatile memory for storing various kinds of data; mode switching means for setting the apparatus in the second mode in response to a request from the management apparatus; reception means for receiving updating data sent from the management apparatus, when the second mode is selected by the mode switching means; storage means for storing the updating data received by the receiving means; and updating means for updating contents of the nonvolatile memory on the basis of the updating data stored in the storage means, and the management apparatus comprising: authentication means for authenticating a user; request means for requesting that contents of the nonvolatile memory of the image forming apparatus be updated, when the authentication means identifies an authorized user; and transmitting means for transmitting the updating data for updating the nonvolatile memory, when the image forming apparatus is switched to the second mode in response to a request made by the request means.

The present invention further provides a data updating method for use in an image forming system that is made up of: an image forming apparatus which has a first mode that can be used by all users and a second mode that can be used by authorized users only, and which executes image forming processing in the first mode; and a management apparatus connected to the image forming apparatus through a communication line, the method comprising: a first step of authenticating a user; a second step of for making an updating request for updating contents of a nonvolatile memory, which is provided in the image forming apparatus and stores various kinds of data; a third step of switching to the second mode when the management apparatus makes the updating request in the second step; a fourth step of transmitting data for updating the nonvolatile memory from the management apparatus when the image forming apparatus is set in the second mode in the third step; a fifth step of receiving the updating data transmitted from the management apparatus in the fourth step; a sixth step of storing the updating data received in the fifth step; and a seventh step of updating the contents of the nonvolatile memory on the basis of the updating data stored in the sixth step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of he invention.

DETAILED DESCRIPTION OF THE INVENTION

An embodiment of the present invention will now be described with reference to the accompanying drawings.

Figure 1:
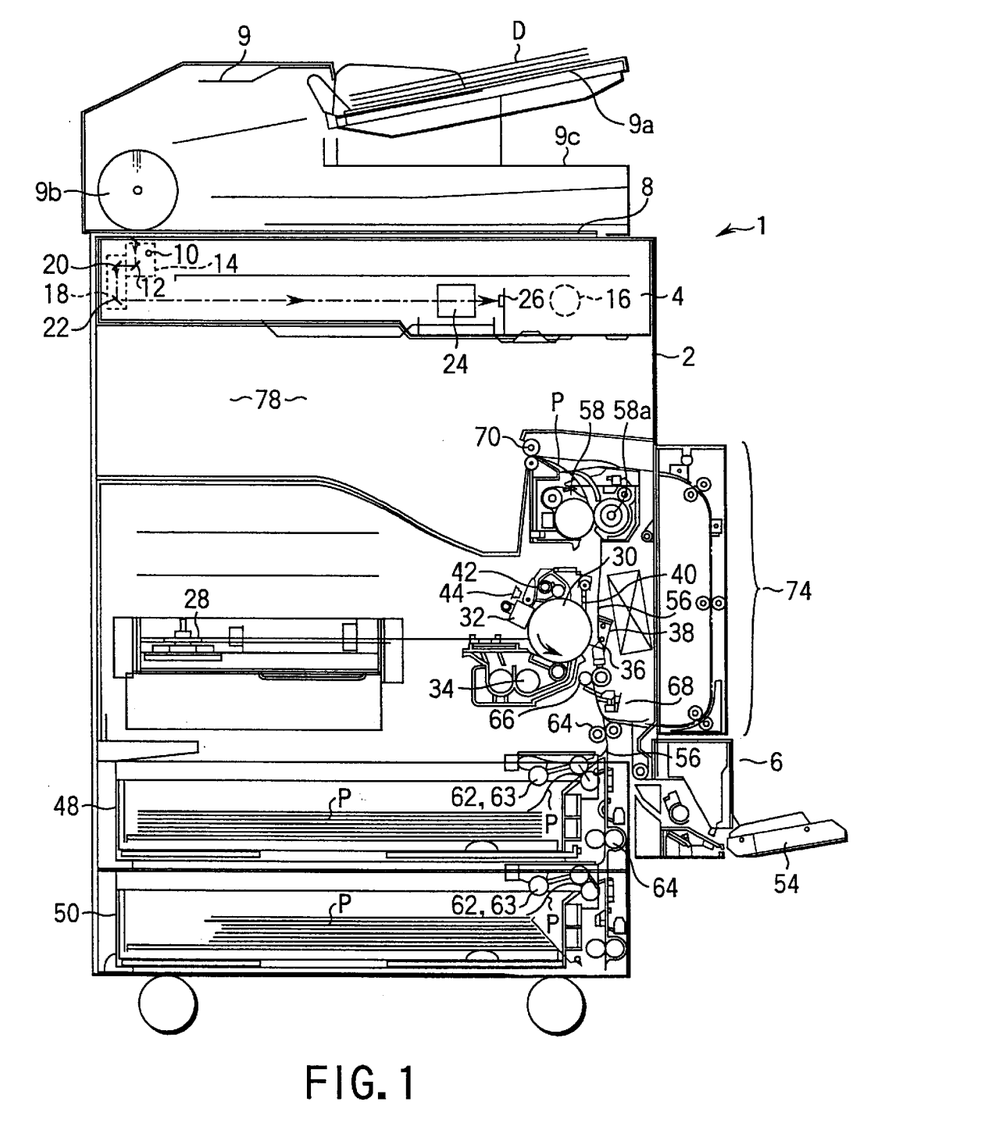
FIG. 1 is a view showing the internal structure of a digital copying machine, which is an embodiment of an image forming apparatus of the present invention.

FIG. 1 is a sectional view showing the schematic structure of a digital copying machine 1, which is an example of an image forming apparatus of the embodiment.

As shown in FIG. 1, the digital copying machine 1 is provided with a main body 2. A scanner section 4 serving as a reading means and a printer section serving as an image forming means are arranged inside the main body 2.

A document table 8, on which an object to be read (i.e., a document D) is placed and which is made of a transparent glass plate, is provided for the upper surface of the main body 2. An automatic document feeder (hereinafter referred to as an ADF) 9 is arranged on the upper surface of the main body 2, so as to automatically feed documents D to the document table 8.

The document D placed on the document tray 9a of the ADF 9 are conveyed by a conveyance guide (not shown) and then discharged onto a discharge tray 9c by a platen roller 9b. When the documents D are being conveyed by the platen roller 9b, an image is read from them by executing an exposure scan by an exposure lamp 10 provided for the scanner section 4 (which will be described later).

The documents D are placed on the document tray 9a of the ADF 9, with the sides to be read being turned upward. They are sequentially fed one by one, beginning with the uppermost one.

The scanner section 4 arranged in the main body 2 is provided with: the exposure lamp 10 which serves as a light source for illuminating either a document D conveyed by the ADF 9 or a document D placed on the document table 8, and which is made of a halogen lamp, for example; and a first mirror 12 which deflects the reflected light from the document D in a predetermined direction. The exposure lamp 10 and the first mirror 12 are mounted on a first carriage 14 located under the document table 8.

The first carriage 14 is movable in parallel to the document table 8. It is moved back and forth in the region under the document table 8 by means of a toothed belt, driven by a scanner motor (a driving motor) 16. The scanner motor 16 is a stepping motor, for example.

A second carriage 18 movable in parallel to the document table 8 is arranged under the document table 8. A second mirror 20 and a third mirror 22, which are for sequentially deflecting the light reflected by the document D and deflected thereto by the first mirror 12, are attached to the second carriage 18 in such a manner that they are perpendicular to each other. The torque of the scanner motor 16 is transmitted to the second carriage 18 through the toothed belt with which the first carriage 14 is driven or through some other suitable means. The second carriage 18 is moved in such a manner as to follow the first carriage 14, and is moved in parallel to the document table 8 at a speed half that of the first carriage 14.

An image-forming lens 24, which focuses the reflected light from the third mirror 20 on the second carriage 18, and a CCD sensor (a line sensor) 26, which receives the reflected light focused by the image-forming lens 24 and photoelectrically converts it, are arranged under the document table 8. The image-forming lens 24 can be moved by a driving mechanism in a plan that includes the optical axis of the light deflected by the third mirror 22. Due to the movement of the image-forming lens 24, the reflected light is focused at a desirable optical power (in the main scan direction). In accordance with image processing clocks supplied from the main CPU, the CCD sensor 26 photoelectrically converts the reflected light incident thereon, and then outputs electric signals corresponding to the read document D. The power in the sub-scan direction can be varied by changing the conveyance speed of the ADF 9 or the moving speed of the first carriage.

When the document D fed by the ADF 9 is read, the position to which light is radiated from the exposure lamp 10 is the fixed position shown in FIG. 1. When the document D placed on the document table 8 is read, the position to which light is radiated from the exposure lamp 10 is moved from left to right along the document table 8.

The printer section 6 is provided with a laser exposure device 28, which functions as a latent image forming means. The laser beam emitted from the laser exposure device 28 is scanned over the circumferential surface of a photosensitive drum 30, thereby forming an electrostatic latent image on the circumferential surface of the photosensitive drum 30.

The printer section 6 is provided with the rotatable photosensitive drum 30, and this drum serves as an image-bearing member located in the substantially-central right region inside the main body 2. The circumferential surface of the photosensitive drum 30 is exposed to a laser beam emitted from the laser exposure device 28, thereby forming a desired electrostatic latent image. Arranged around the circumferential surface of the photosensitive drum 30 are: an electric charger 32 for electrically charging the drum circumference to have a predetermined charging characteristic; a developing unit 34 which serves as a developing means and develops the electrostatic latent image formed on the circumference of the photosensitive drum 30 at a desirable image density by supplying toner, i.e., a developing agent, to that image; and a separation charger 36 for separating image formation mediums (copy sheets) fed from cassettes 48 and 50 (to be described later) from the photosensitive drum 30. These structural members constitute an integral one-body structure. Also arranged around the photosensitive drum 30 are: a transfer charger 38 for transferring a toner image formed on the photosensitive drum 30 onto a sheet P; a separation claw 40 for separating the copy sheet P from the circumference of the photosensitive drum 30; a cleaning device 42 for removing the residual toner from the circumference of the photosensitive drum 30; and an electrical discharge unit 44 for electrically discharging the circumference of the photosensitive drum 30. These structural members are arranged in the order mentioned.

In the lower region inside the main body 2, an upper cassette 48 and a lower cassette 50 are stacked one upon the other. Each of these cassettes can be drawn out from inside the main body 2. Copy sheets P different in size are stored in the respective cassettes 48 and 50. A manual insertion tray 54 is provided at one end of upper cassette 48.

A sheet feed path 56 is defined inside the main body 2. The sheet fed path 56 extends from the cassettes 48 and 50 to a traffic section, which is located between the photosensitive drum 30 and the transfer charger 38. A fixing unit 58 is arranged at the terminating end of the sheet feed path 56. A discharge port (not shown) is formed in the upper portion of the fixing unit 58.

A feed roller 62 and a separation roller 63 are arranged in the neighborhood of each of the upper and lower cassettes 48 and 50. By these rollers, the sheets P are taken out from each of the cassettes 48 and 50 one by one. A large number of pairs of feed rollers 64 are provided along the sheet feed path 56 so that the copy sheets P taken out by the feed and separation rollers 62 can be fed along the sheet feed path 56.

The sheet feed path 56 is provided with a pair of register rollers 66 located upstream of the photosensitive drum 30. By means of the register rollers 66, a skew of the taken-out copy sheet P is corrected, and the front end of the toner image on the photosensitive drum 30 and the leading edge of the copy sheet P are controlled to agree with each other. Then, the copy sheet P is supplied to the transfer section at the same speed as the peripheral moving speed of the photosensitive drum 30. A pre-aligning sensor 68 for detecting the arrival of a copy sheet P is arranged immediately before the paired register rollers, i.e., on that side of the register rollers 66 which is closer to the feed rollers 64.

Copy sheets P, taken out one by one from the cassettes 48 and 50 by the feed rollers 62, are fed by the feed rollers 64 and supplied to the paired register rollers 66. After the leading edge of a copy sheet P is adjusted in position by the register rollers, it is fed to the transfer section.

In the transfer section, a developer image (i.e., a toner image) formed on the photosensitive drum 30 is transferred onto the sheet P by the transfer charger 38. After the toner image is transferred, the copy sheet P is separated from the circumference of the photosensitive drum by the separation charger 36 and the separation claw 40. Then, it is conveyed to the fixing unit 58 by a conveyance belt (not shown), which constitutes part of the sheet feed path 58. By the fixing unit 58, the developer image is melted and fixed to the copy sheet P. Then, copy sheet P is discharged from the discharge port (not shown) by a pair of discharge rollers 70, and is thus fed onto a discharge section 78.

An automatic reversing device 74 is arranged on the right side of the sheet feed path 56. The automatic reversing device 74 receives a copy sheet P when this copy sheet P has passed the fixing unit 58, reverses the copy sheet P, and then returns it to the sheet feed path 56.

On the upper front portion of the main body 2, a control panel (to be described later) is provided, for entering various copying conditions, such as a copy magnification, and for designating the start of a copying operation.

The control panel is provided with a liquid crystal display (LCD) of a touch key incorporated type, which shows a variety of operation guides and enables entry of various designations.

Figure 2:
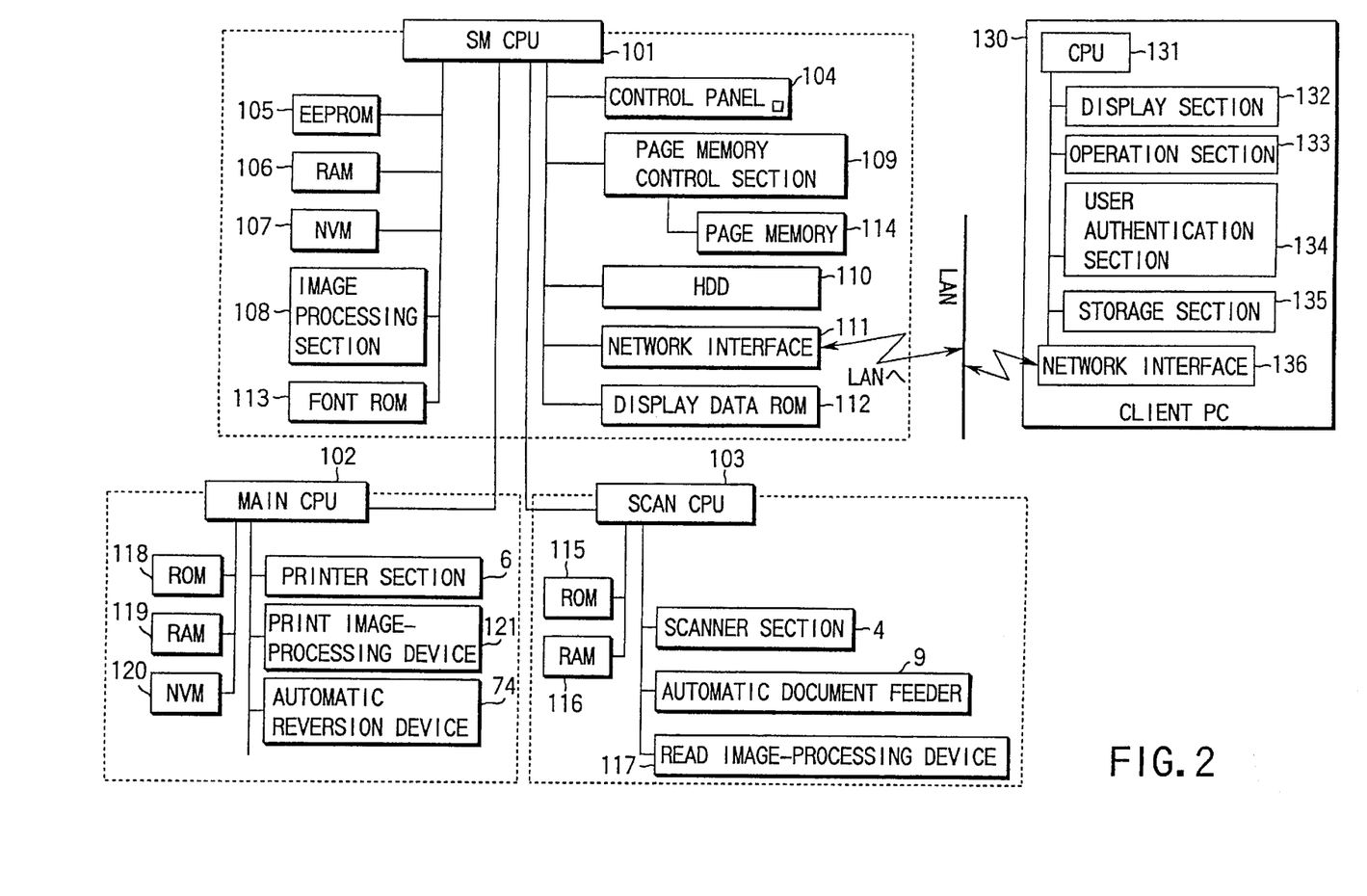
FIG. 2 is a block diagram showing the structure of the control system of the digital copying machine.

FIG. 2 is a block diagram showing the control system of the digital copying machine 1.

The control system of the digital copying machine 1 is made up of three CPUs, namely, an SM (System Main)-CPU 101 serving as a main controller, a MAIN-CPU 102 for controlling the printer section 6, a SCAN-CPU 103 for controlling the scanner section 4.

The SM-CPU 101 performs serial communication with the MAIN-CPU 102. The SM-CPU 101 issues an operating command, and the MAIN-CPU 102 executes an operation on the basis of the command and simultaneously sends back a signal indicative of the operating status.

The SCAN-CPU 103 performs serial communication with the SM-CPU 101. On the basis of the operating command issued by the SM-CPU 101, the SCAN-CPU 103 executes an operation and simultaneously sends back a signal indicative of the operating condition.

In this manner, the SM-CPU 101 is informed of an operating condition as a status signal at all times. It controls the entirety of the digital copying machine 1, making determinations with respect to the operating conditions and inputs from the control panel 104.

To the SM-CPU 101, an EEPROM 105, a RAM 106, an NVM 107, an image processing section 108, a page memory control device 109, a hard disk drive (HDD) 110, a network interface 111, a display data ROM 112, a font ROM 113, etc. are connected.

The SM-CPU 101 controls the entirety of the digital copying machine 1. The EEPROM (a nonvolatile memory) 105 stores control programs and control data of various kinds. The RAM 106 temporarily stores data.

The NVM (a nonvolatile random access memory: a nonvolatile RAM) 107 is a nonvolatile memory backed up by a battery (not shown), and the data in the NVM 107 can therefore be retained even after the power switch is turned off.

The image processing section 108 is made of an image processing circuit, for example, and executes various kinds of image processing, such as trimming, masking, image compression, and image expansion. The page memory control section 109 records image data in a page memory 114 and reads them out from the page memory 114.

The hard disk drive 110 records image data and control data, which are in the form of files. The hard disk drive 110 also records updating data with which to update the EEPROM, and data indicating the state of the EEPROM when the contents thereof are being updated.

The network interface 111 is connected to a local area network (LAN) through a communication line. Print data sent from an external device (e.g., a personal computer) connected to the LAN are received by the network interface 111.

The display data ROM 112 is an EEPROM (a nonvolatile memory), for example. It stores display data to be displayed on the control panel 104, such as graphic data and common data used in common to various countries. The font ROM 113 is an EEPROM (a nonvolatile memory), for example. It stores font data corresponding to the language of the country where the digital copying machine 113 is employed. The font data are stored in correspondence to code data, such as character codes.

The HDD 110 records image data that are processed as files by the image processing section 108. When the network interface 109 receives a file that contains the updating data for updating the nonvolatile memory, the file of the updating data is recorded in the HDD 110.

A ROM 115, a RAM 116, the scanner section 4, the ADF 9 and a read image-processing device 117 are connected to the SCAN-CPU 104.

On the basis of the SM-CPU 101, the SCAN-CPU 104 controls the scanner section 4, the ADF 9 and the read image-processing device 114. The ROM 115 stores various control programs and control data of various kinds. The RAM 116 stores data temporarily. The read image-processing device 117 executes processing, such as image property correction, with respect to a document image read by the scanner section 4.

A ROM 118, a RAM 119, an NVM 120, the printer section 6, a print image-processing device 121 and the automatic reversing device 74 are connected to the MAIN-CPU 102.

On the basis of the SM-CPU 101, the MAIN-CPU 102 controls the printer section 6, the print image-processing device 121 and the automatic reversing device 74. The ROM 118 stores control programs and control data of various kinds. The RAM 119 stores data temporarily. The NVM is a nonvolatile memory backed up by a battery (not shown).

The print image-processing device 121 executes shading correction, smoothing processing, edge enhancement, scaling processing, gradation processing, etc.

The image processing section 108, the page memory 114, the read image-processing device 117 and the print image-processing device 121 are connected together by way of an image data bus (not shown).

The digital copying machine 1 of the above structure is connected to the LAN through the network interface 111, as shown in FIG. 2. A client computer (PC) 130, serving as a management apparatus, is connected to the LAN.

The client PC 130 comprises a CPU 131, a display section 132, an operation section 133, a user authentication section 134, a storage section 135, a network interface 136, etc.

The CPU 131 controls the entirety of the client PC 130. The display section 132 displays a guide message to the user. Through the operation section 133, the user enters operating commands, and further enters a password or an input code comprised of specific letters or characters. The user authentication section 134 performs authentication processing with respect to a user on the basis of the input code entered from the operation section. The storage section 135 stores control data of various kinds, and also stores (or installs) control programs. The network interface 136 is connected to the LAN.

In the client PC 130, driver software designed specifically for connection to the digital copying machine 1 through the LAN is installed. Through the driver software, the client PC 130 is connected to the digital copying machine 1 for communication, thus realizing the environments required of an ordinary network printer.

The digital copying machine of the above structure has various operation modes, including an ordinary mode, a setting mode and an adjustment mode. The ordinary mode is an operation mode selected when an ordinary user employs the digital copying machine 1 to make a copy or to use it as a printer. The setting and adjustment modes can be used only by an authorized user or a serviceman having expertise; it cannot be selected by the ordinary user. In the description below, the setting or service mode that is used only by the authorized user or the serviceman will be referred to as a service mode.

The ordinary mode and the service mode are switched over under the control of the SM-CPU 101. When the ordinary mode is to be switched to the service mode, the SM-CPU 101 determines whether or not the switching to the service mode is possible. For example, when the digital copying machine is in the act of making a copy, executing a print operation, spooling a print job, or interrupting the print operation, the SM-CPU 101 gives preference to these operations and determines that the switching to the service mode is impossible. In other words, when the digital copying machine is in the standby state, the SM-CPU 101 determines that the switching to the service mode is possible. When the digital copying machine is already in the service mode, a request for switching to the service mode cannot be accepted even if it is made by some other client PC connected to the LAN.

When the SM-CPU 101 determines that the switching is possible, the service mode is selected. That is, the SM-CPU 101 switches the ordinary mode to the service mode, without having to turn on the power switch of the digital copying machine 1.

In the service mode, the SM-CPU 101 disables the copy function or printer function provided to ordinary users. In the service mode, therefore, the SM-CPU 101 does not permit the control panel 104 to be operated or prevents an operation an ordinary user requests through the LAN.

The reason for disabling the functions in the service mode is to secure safety in updating the data. For example, in the service mode, the EEPROM is updated on the basis of the data supplied from the client PC 130, as will be described later. In this case, the operations corresponding to the functions, such as a copying function, may conflict, and if this occurs, a malfunction is highly probable. To prevent the malfunction, the ordinary users are prevented from executing the operations corresponding to the functions in the service mode.

When a request for switching the present mode to the service mode is received from the client PC 130, a determination is made as to whether the digital copying machine is being used by an ordinary user. If it is, priority is given to the use by the ordinary user, and the switching to the service mode is disabled.

Conversely, where the mode is switched from the service mode to the ordinary mode, the SM-CPU 101 first shuts down the machine or reboots it in response to a shutdown or reboot request, and then the mode is switched to the ordinary mode.

If there is no request for shutdown or reboot, and the request for merely terminating the service mode is received, the SM-CPU 101 switches the mode to the ordinary mode without the power switch being operated. In this case, the updated data or altered settings entered in the service mode do not come into effect until the digital copying machine is rebooted.

The digital copying machine 1 comprises EEPROMs 105, 112 and 113 for storing control programs, graphic data used for display on the control panel, data be used in common to different countries, and data being peculiar to each country. The data in these EEPROMs 105, 112 and 113 are updated in the service mode in accordance with the updating data downloaded from the client PC 130. In addition, the data in the EEPROMs can be rewritten on the basis of various adjustment values and setting values stored in the HDD 110 of the digital copying machine 1, when a request for doing so is made by the client PC 130.

Figure 3:
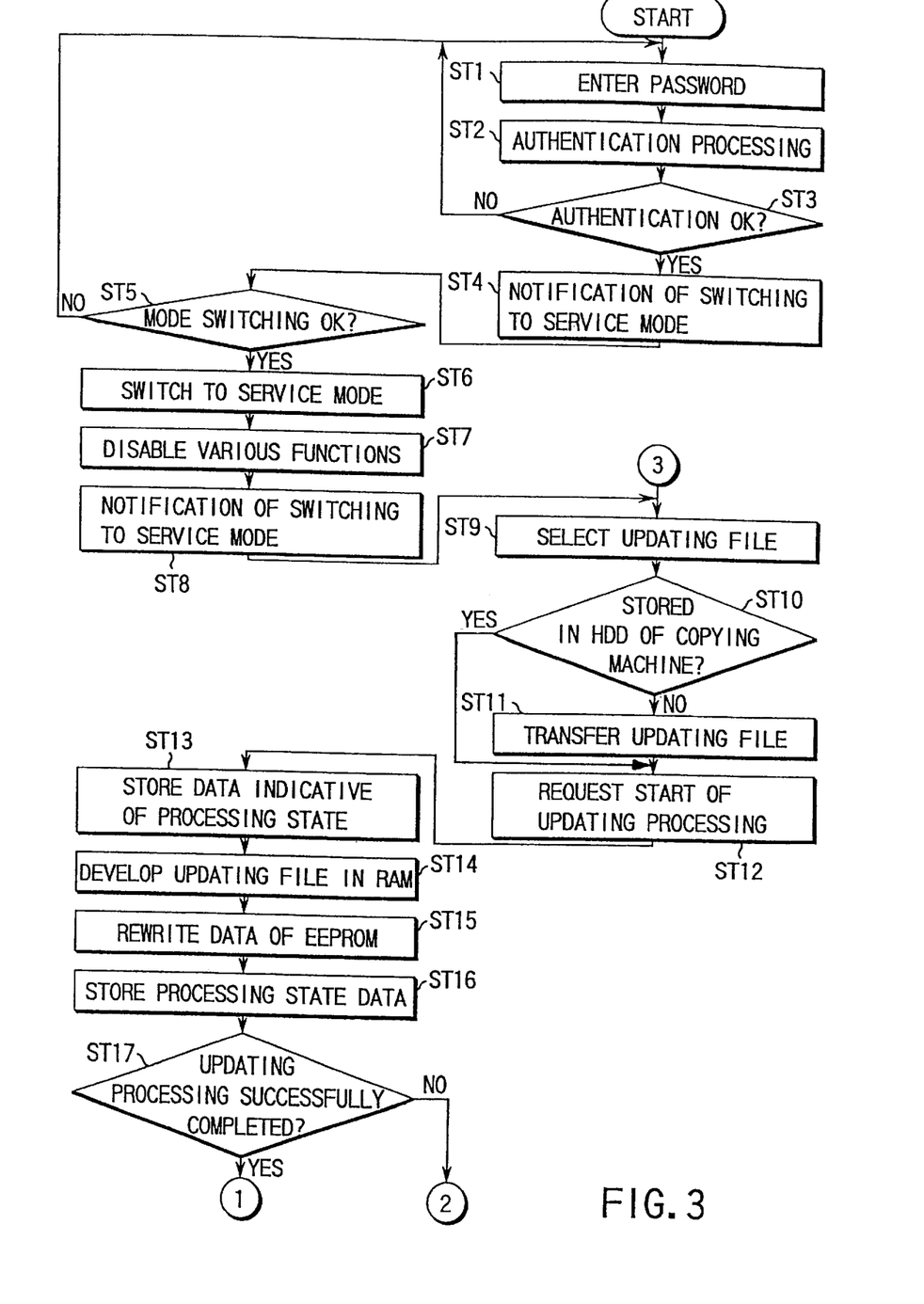
FIG. 3 is a flowchart illustrating how the data in an EEPROM are updated.
Figure 4:
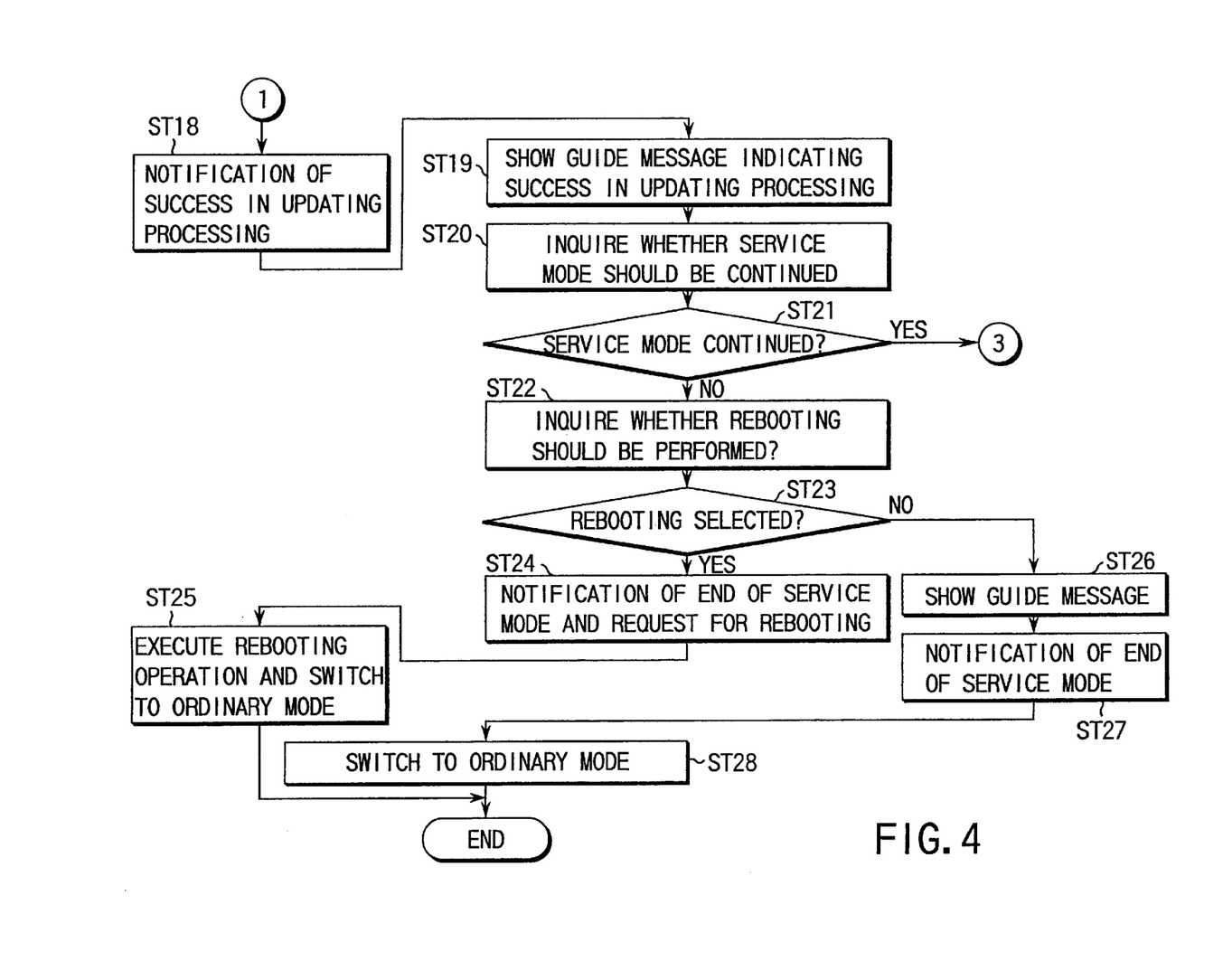
FIG. 4 is a flowchart illustrating how the data in the EEPROM are updated.
Figure 5:
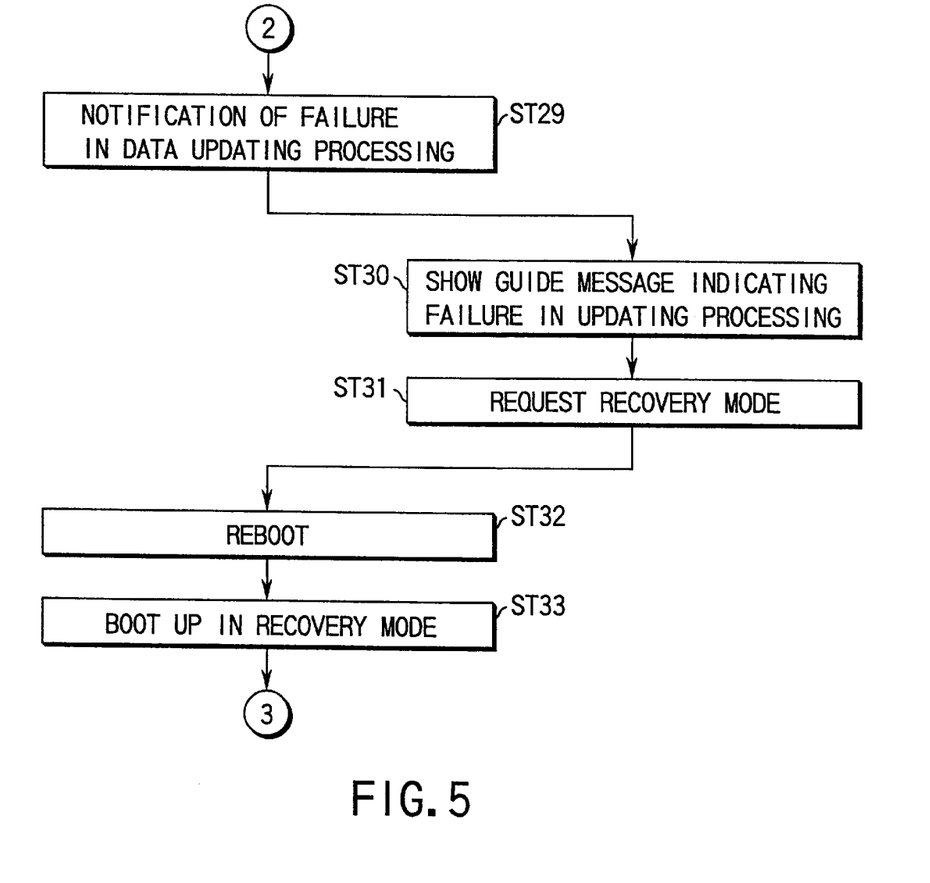
FIG. 5 is a flowchart illustrating how the data in the EEPROM are updated.

FIGS. 3, 4 and 5 are flowcharts illustrating how the data in the EEPROMs of the digital copying machine 1 are updated by the client PC 130. It is assumed that software for controlling the download of data to the digital copying machine is installed in the client PC 130. In the description below, reference will be made to the case where the data in the EEPROM 105 are updated.

First of all, the operator designates the start of the updating processing for the EEPROM 105 by use of the operation section 133 of the client PC 130. In response to this designation, the CPU 131 boots the software for controlling the download of the data to the digital copying machine 1. On the basis of the program of the software, the CPU 131 requests that the user enter either a password or an input code comprised of specific letters or characters and used for the authentication of a user (Step ST1).

Upon reception of the request, the user enters the input code, such as the password, from the operation section 133. The CPU 131 controls the user authentication section 134 to perform authentication processing with respect to the user corresponding to the entered input code (Step ST2).

The service mode, in which the EEPROM of the digital copying machine 1 is updated, is available to limited persons, so that it can be selected by authorized users (super users) or servicemen. Before the updating processing for the EEPROM 105 is started, the client PC 130 executes user authentication processing on the basis of the entered password or the input code comprised of specific characters or letters.

If the user authentication processing shows that the user is not entitled to perform updating processing, the CPU 131 returns to Step ST1 described above and requests that the user enter a password or an input code. If the user authentication processing shows that the user is entitled to perform the updating processing, (Step ST3), the CPU 131 notifies the digital copying machine 1 of the request for switching to the service mode (Step ST4).

The SM-CPU 101 of the digital copying machine, which receives the request for switching to the service mode, determines whether or not it is possible to switch to the service mode (Step ST5). This determination is made by checking whether or not the digital copying machine 1 is performing an operation based on the copy or printer function. If the digital copying machine 1 is performing an operation, it is determined that the switching to the service mode is impossible. If the digital copying machine 1 is in the standby state, it is determined that the switching to the service mode is possible.

If the determination described above is that the switching to the service mode is impossible, the SM-CPU 101 informs the client PC 130 that the switching to the service mode is impossible. Thereafter, the SM-CPU 101 returns to Step ST1.

If the determination is that the switching to the service mode is possible, the SM-CPU 101 switches the mode to the service mode (Step ST6). At the time, the SM-CPU 101 switches the mode from the ordinary mode to the service mode, without the power switch of the digital copying machine being operated. In this service mode, the SM-CPU 101 disables various functions provided to ordinary users, such as the copy function and printer function (Step ST7).

When the mode has been switched to the service mode, the SM-CPU 101 notifies the client PC of this mode switching (Step ST8). The receipt of the notification establishes the connection of the client PC 130 to the digital copying machine 1 in the service mode.

When the connection to the digital copying machine 1 is established in the service mode, the CPU 131 requests that the operator select the file containing the updating data to be downloaded to the digital copying machine 1 (Step ST9). In response to this request, the operator selects the file of the updating data for the EEPROM 105. The file of the updating data may be a file stored in the storage section 135 of the client PC 130; alternatively, it may be a file stored in the HDD 110 of the digital copying machine 1. In other words, the operator selects an updating data file from either the storage section 135 or the HDD 110.

Where the operator selects the file stored in the client PC 130 (Step ST10), the CPU 131 controls the network interface 136 and transfers the file to the digital copying machine 1 by way of the LAN (Step ST11). The file transferred through the LAN is stored in the HDD 110 of the digital copying machine 1.

Where the operator selects the file stored in the HDD 110 of the digital copying machine 1 (Step ST10), only the information indicating the selected file are transmitted. In this case, the file transfer processing using the LAN is not executed.

When the file of the updating data is decided in this manner, the CPU 131 requests that the digital copying machine 1 start the updating processing (Step ST12).

Upon receipt of this request, the SM-CPU 101 controls the other EEPROMs 112 and 113, the NVM 107 or the HDD 110, which are not updated, in such a manner that they store the data indicative of the processing state exhibited before the updating (Step ST13). After the processing state exhibited before the updating is recorded in this manner, the SM-CPU 101 executes the updating processing for the EEPROM 105 (Steps ST 14 and ST 15).

To update the EEPROM 105, the SM-CPU 101 first acquires a file containing the updating data from the HDD 110 of the image forming apparatus. Then, the SM-CPU 101 temporarily develops the acquired file in the RAM 106 (Step ST14). After the file is developed in the RAM 106, the SM-CPU 101 updates the data in the EEPROM 105 (Step ST15). The EEPROM 105 is updated by first erasing data from the to-be-rewritten storage area of the EEPROM 105 and then writing the data developed in the RAM 106. The data written in the EEPROM 105 are verify-read.

At the end of the processing continued up to Step 14, the SM-CPU 101 controls the other EEPROMs 112 and 113, the NVM 107 or the HDD 110 in such a manner that they store the data indicative of the processing state that is exhibited after the updating (Step ST16).

Subsequently, the SM-CPU 101 checks whether or not the data in the EEPROM 105 are normal, on the basis of the verify-read operation performed in Step 15. By this check, it is determined whether or not the data in the EEPROM 105 have been successfully updated (Step ST17). If the determination indicates successful updating, the SM-CPU 101 notifies the client PC 130 of the success in the data updating processing (Step ST18).

Upon receipt of the notification, the CPU 131 of the client PC 130 notifies the operator that the updating processing has been successfully performed (Step ST19), and inquires of the operator whether the service mode should be continued (Step ST20). If the user wants to maintain the service mode and execute updating processing of other data (Step ST21), then the flow returns to Step ST9 to select a file to be updated. In this manner, the user can maintain the service mode and wastes no time updating other data.

To end the service mode (Step ST21), the user designates the end of the service mode by operating the operation section 133. In response to this, the CPU 131 inquires of the user whether or not the digital copying machine 1 should be rebooted so as to bring the updated contents into effect (Step ST22). If the updated contents should be brought into effect immediately, the user designates the rebooting of the digital copying machine 1. If the digital copying machine need not be rebooted, then the user can designates the end of the processing without rebooting it.

If the user selects the rebooting of the digital copying machine 1 (Step ST23), the CPU 131 notifies the digital copying machine 1 of both the end of the service mode and the request for the rebooting (Step ST24).

The SM-CPU 101 of the digital copying machine that receives the notification automatically executes the rebooting operation (Step ST25). In this rebooting operation, the digital copying machine 1 is first powered off and then booted up in the ordinary mode. By this rebooting of the digital copying machine, the contents of the EEPROM 105 are brought into effect.

If the user designates ending the operation without rebooting (Step ST23), the CPU 131 controls the display section 132 to show a message indicating that the updated contents take effect after the digital copying machine 1 is rebooted (Step ST26). Subsequently, the CPU 131 notifies the digital copying machine 1 of the end of the service mode (Step ST27).

The SM-CPU 101 of the digital copying machine 1, which is notified that the service mode should be ended without rebooting, is switched from the service mode to the ordinary mode, without the rebooting operation being performed (Step ST28).

If Step ST17 described above does not determine that the data in the EEPROM 105 have been successfully updated, the SM-CPU 101 notifies the client PC 130 of the failure in the data updating processing (Step ST29).

The CPU 131 of the client PC 130, which receives the notification, indicates to the operator a guide message that the data updating has resulted in failure (Step ST30). After the user confirms the guide message, the CPU 131 informs the digital copying machine 1 of the request for rebooting (Step ST 31), so as to retry the data updating processing.

The SM-CPU 101 of the digital copying machine 1, which receives the information, automatically executes the rebooting operation (Step ST32). At the time of this rebooting, the SM-CPU 101 first powers off the digital copying machine 1 and then boots it up in a recovery mode, in which a data updating operation is automatically executed (Step ST33). The recovery mode is a mode wherein the operation of updating the data in EEPROM 105 is resumed on the basis of the processing state-indicating information stored in the other EEPROMs or the HDD. After booting up in the recovery mode, the SM-CPU 101 advances to step ST9, and the above-described processing is executed again.

As described above, when the data in the EEPROM are updated, the state of the data updating processing is stored in the other EEPROMs or in the HDD.

Owing to this, even if the data updating processing is interrupted or abrupt power failure occurs, priority is given to the service mode (recovery mode) when the power supply is switched on again, and the booting operation is executed on the basis of the stored data on the processing state. In this manner, the data updating operation can be resumed.

If a file containing updating data is transferred through a LAN, the transferred file is stored in an HDD. Even in the case of a very unusual situation, as in the case where the power fails when data are being written in the EEPROM, the stored file can be used as a backup file of the updating data, and the file need not be transferred again when the processing is resumed. Hence, it is possible to save the time which might be required for retransferring the file.

Where a download file is stored in the storage device (HDD) of the image forming apparatus (digital copying machine), the following additional advantages are brought about.

Although the language data of different countries are stored in an EEPROM, the number of languages that can be actually stored is restricted due to the storage capacity of that EEPROM. This means that EEPROMs containing different language data have to be prepared in accordance with the specifications required. However, the amount of language data which can be stored in the HDD is far larger than that which can be stored in an EEPROM. This being so, EEPROMs can be prepared without reference to the specifications required of them, and a very large amount of language data are available by using the language data stored in the HDD.

The file stored in the HDD cannot be deleted unless an authorized user operates the machine in the service mode. Hence, until the file is deleted by the authorized user, the control programs, the language data, etc., which have been used until then, are kept stored in the HDD. Owing to this feature, the control program, the language data and other kinds of data used until then can be restored as the data in an EEPROM, as long as the file remains undeleted. In addition, since the client PC (management apparatus) does not have to perform a retransfer operation, the processing time is as short as possible.

As described above, a file containing updating data is transferred from the management apparatus, which is connected to the image forming apparatus through the communication line. The file, thus transferred, is first stored in the HDD of the image forming apparatus, and then the updating data are read out from the HDD so as to update the data in the EEPROM.

Even if the data updating operation ends in failure, it is not necessary to retransfer the data from the management apparatus, and the processing time required for executing the updating operation once again can be as short as possible.

The management apparatus is connected to the image forming apparatus by way of the communication line, and an authorized user operates that management apparatus to switch to the service mode. As a result of this operation, the image forming apparatus is temporarily switched to the service mode, in which ordinary use of the apparatus is prohibited. During the service mode, the image forming apparatus causes the storage device to temporarily store the updating control program and display data, which are sent from the management apparatus. Thereafter, the image forming apparatus reads the updating data from the storage device, and the data in the EEPROM are updated in accordance with the updating data.

Owing to this, the contents of a ROM, such as the control program, the graphic data for display, or the language data on each country, can be updated in safety, without physically replacing the ROM with another. In addition, the users who can update the contents of a ROM are restricted to predetermined users, and the data are downloaded through the communication line. Ordinary users are not therefore allowed to download data for some wrong purpose.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus which has a first mode that can be used by all users and a second mode that can be used by authorized users only, and which executes image forming processing in the first mode, said image forming apparatus comprising:

a PROM for storing various kinds of data;

a communication interface for controlling communication with a management apparatus, which is connected to the image forming apparatus through a communication line; and     a hard disk device that stores updating data for updating the PROM;

a main control section for performing mode switching processing, by which the first mode is switched to the second mode in response to a mode switching request that is received from the management apparatus through the communication interface, and also performing data updating processing of the PROM in the second mode, wherein         when updating data is designated by the managing apparatus through the interface, updating data is read out from the hard disk device, and the data in the PROM is updated based on the readout updating data, and when updating data is received from the management apparatus through the interface, the data in the ROM is updated based on the received updating data.

2. The image forming apparatus according to claim 1, wherein said PROM is a memory that stores a control program for controlling image formation processing or language data.

3. An image forming apparatus according to claim 1, which further comprises a display section for displaying an operation guide, and in which said PROM is a memory that stores display data to be shown on the display section.

4. An image forming apparatus according to claim 1, wherein said main control section prohibits operations other than an operation of updating the PROM in the second mode.

5. An image forming apparatus according to claim 1, wherein said main control section stores data indicative of a processing state in a PROM different from the PROM to be updated or in the hard disk device, before execution of the data updating processing of the PROM, and if the data updating processing of the PROM ends in failure, data indicative of a state before the updating processing is read out from the PROM different from the PROM to be updated or the hard disk device, and the image forming apparatus is rebooted.

6. An image forming apparatus according to claim 1, wherein the main control section records updating data in the hard disk device when the updating data is received from the managing apparatus, and executes the data updating processing of the PROM once again if the updating fails to successfully update the PROM on the basis of the data stored in the hard disk device.

7. An image forming apparatus according to claim 1, wherein said main control section prohibits switching to the second mode when the image forming processing is being executed, and allows switching to the second mode when the image forming processing is not being executed.

8. An image forming system including: an image forming apparatus which has a first mode that can be used by all users and a second mode that can be used by authorized users only, and which executes image forming processing in the first mode; and a management apparatus connected to the image forming apparatus through a communication line, said image forming apparatus comprising:
a PROM for storing various kinds of data;
a first communication interface for controlling communication with the management apparatus;
a hard disk device that stores updating data for updating the PROM;
a main control section for performing mode switching processing, by which the first mode is switched to the second mode in response to a mode switching request that is received from the management apparatus through the communication interface, and also performing data updating processing of the PROM in the second mode, wherein
when updating data is designated by the managing apparatus through the interface, updating data is read out from the hard disk device, and the data in the PROM is updated based on the readout updating data, and
when updating data is received from the management apparatus through the interface, the data in the PROM is updated based on the received updating data, said management apparatus comprising:
a second communication interface for controlling communication with the image forming apparatus;
a user authentication section for authenticating a user;
a CPU for transmitting a switching request to the second mode to the image forming apparatus, when the user authentication section identifies an authorized user, and for transmitting information indicative of updating data or updating data itself when the image forming apparatus is in the second mode.

9. An image forming apparatus according to claim 8, wherein the PROM is a memory that stores a control program for controlling image formation processing or language data.

10. An image forming apparatus according to claim 8, which further comprises a display section for displaying an operation guide, and in which said PROM is a memory that stores display data to be shown on the display section.

11. An image forming apparatus according to claim 8, wherein said control section prohibits operations other than an operation of updating the PROM in the second mode.

12. An image forming apparatus according to claim 8, wherein said main control section stores data indicative of a processing state in a PROM different from the PROM to be updated or in the hard disk device, before execution of the data updating processing of the PROM, and if the data updating processing of the PROM ends in failure, data indicative of state before the updating processing is read out from the PROM different from the PROM to be updated or the hard disk device, and the image forming apparatus is rebooted.

13. An image forming apparatus according to claim 8, wherein the main control section records updating data in the hard disk device when the updating data is received from the managing apparatus, and executes the data updating processing of the PROM once again if the updating fails to successfully update the PROM on the basis of the data stored in the hard disk device.

14. An image forming apparatus according to claim 8, wherein said main control section prohibits switching to the second mode when the image forming processing is being executed, and allows switching to the second mode when the image forming processing is not being executed.

15. A PROM date updating method for use in an image forming system that includes an image forming apparatus which has a first mode that can be used by all users and a second mode that can be used by authorized users only, and which executes image forming processing in the first mode; and a management apparatus connected to the image forming apparatus through a communication line, said method comprising:
a first step of switching from the first mode to the second mode upon reception of a mode switching request from the management apparatus, which is connected through a communication line;
a second step of reading out updating data from a hard disk device and updating data in a PROM, when the data stored in the hard disk device is designated as updating data by the managing apparatus when second mode has been selected by the first step;
a third step of updating the data in the PROM on the basis of the updating data received from the management apparatus when the second mode has been selected by the first step.

16. A PROM data updating method according to claim 15, further comprising a fourth step of prohibiting operations other than an operation of updating the PROM during the second mode, in a case where the second mode is selected in the first step.

17. A PROM data updating method according to claim 15, further comprising:

fifth step of storing data indicative of a processing state in a PROM different from the PROM to be updated or in the hard disk device, before the data updating processing of the PROM is executed in the second or third step;

sixth step reading out data indicative of a state before the updating processing is executed from the PROM different from the PROM to be updated or from the hard disk device, and rebooting the image forming apparatus, said sixth step being executed if the data updating processing of the PROM ends in failure.

18. A PROM data updating method according to claim 15, further comprising:

said third step includes:

a seventh step of storing data in the hard disk device when the updating data is received from the managing apparatus; and an eighth step of updating the data in the PROM by reading out the updating data from the hard disk device; and a ninth step of executing the data updating processing of the PROM once again on the basis of the updating data stored in the hard disk in the seventh step, said ninth step being executed if the data updating processing of the PROM ends in failure.

19. A PROM data updating method according to claim 15, wherein said first step prohibits switching to the second mode if the image forming processing is being executed when a mode switching signal is received from the management apparatus, and allows switching to the second mode if the image forming processing is not being executed then.

* * * * *